May 26, 1942. F. J. LINSLEY 2,284,526
POSTAL SCALE
Filed Sept. 18, 1939
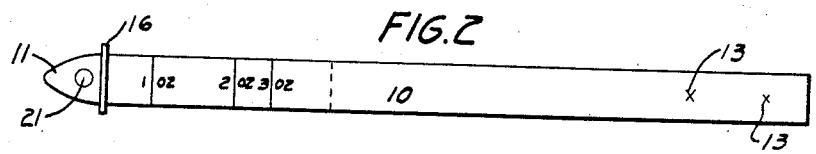
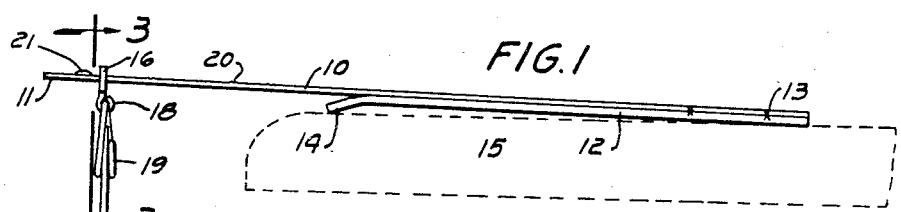
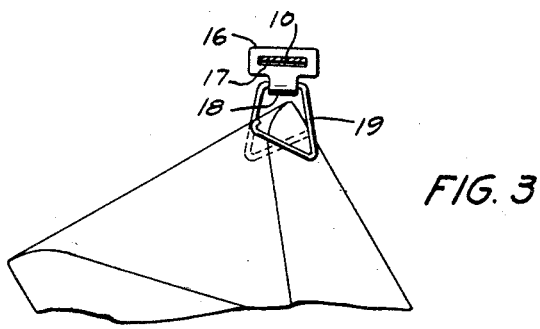
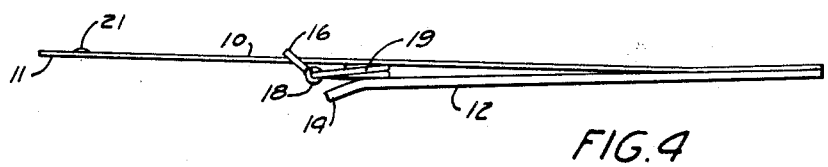
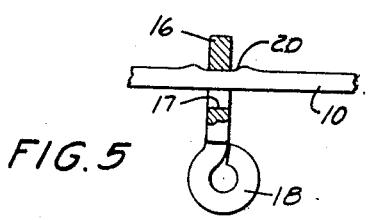
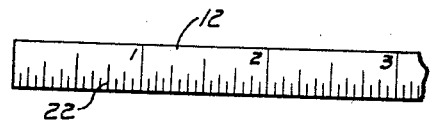
INVENTOR
F. J. Linsley
BY Edwin C. McRae
ATTORNEY Patented May 26, 1942

2,284,526

UNITED STATES PATENT OFFICE 2,284,526

POSTAL SCALE

Frank J. Linsley, Pasadena, Calif.

Application September 18, 1939, Serial No. 295,365

4 Claims. (Cl. 265—53)

The object of my invention is to provide a postal scale for conveniently weighing individual letters to ascertain the amount of postage required.

A further object of my invention is to provide a scale which may be read at a glance.

Still a further object of my invention is to provide a postal scale which is characterized by its ruggedness and the absence of springs therefrom.

Still a further object of my invention is to provide a postal scale which will be convenient to use, will take very little space and which, when not being used as a scale, may be used as a letter opener or as a measuring scale.

Scales of this general nature have been conceived in the past, but they have never been commercially used to any extent because of the difficulty in reading the weights. All of the scales of this type with which the applicant is familiar are required to be placed on a flat surface over a relatively sharp corner when in use. These devices have usually been equipped with a plurality of fulcrum points so that the reading of the scale is ascertained from the particular fulcrum point around which the scale pivots. This fact is difficult to ascertain, especially where the device is used on a surface having a slightly rounded edge. With my improved scale, the reading is taken directly from the scale beam.

With these and other objects in view, my invention consists in the construction and combination of the various parts of my improved device as described in this specification, claimed in my claims, and illustrated in the accompanying drawing, in which:

Figure 1 is a side elevation of my improved scale in position for use on the ordinary desk or table top.

Figure 2 is a plan view of the scale shown in Figure 1.

Figure 3 is a sectional view taken upon the line 3—3 of Figure 1.

Figure 4 is a view showing a convenient way in which the scale clip is held in position by the scale body.

Figure 5 is an enlarged sectional view through the scale slide showing how the slide is held in one of a plurality of its registering positions, and Figure 6 is a view showing the linear measuring scale provided on the weighted end of the scale.

Referring to the accompanying drawing, I have used the reference numeral 10 to indicate a scale beam which is formed of relatively thin strip steel. One end of the beam 10 is pointed, as shown at 11, so as to form a letter opener. A counter-weight arm 12 is formed of relatively thick steel of substantially the same width as the beam 10 but having a length only a little over half as long as the beam 10. The arm 12 is spot welded to the end of the beam 11 opposite the pointed end, as shown by crosses 13. Rivets may also be used in place of welding for securing these two members together if desired. The end of the arm 12 opposite its point of attachment to the beam 10 is bent downwardly to form a fulcrum 14.

When the beam and arm assembly, just described, is placed on a table or flat surface, as shown at 15 of Figure 1, the unit will rest upon the fulcrum 14 and the rear end of the arm 12. A weight placed upon the pointed end of the beam, if of a sufficient amount, will cause the assembly to pivot around the fulcrum point 14.

A slide member 16 is stamped from sheet metal with an elongated slot 17 therein through which the beam 10 is inserted. A tongue 18 projects from the bottom of the slide 16, which tongue is bent around to form an eye in which a clip 19 is pivotally secured. The clip 19 is formed as a U-shaped wire member with overlapping ends which are spring-urged together. A letter may thus be pushed up into the clip and will be frictionally retained therein.

The beam 10, between the fulcrum 14 and the pointed end thereof, is provided with a number of transverse notches 20 therein which are so arranged in reference to the fulcrum 14 and weight of the arm 12 and beam 10 so that they represent ounce calibrations on the scale. When the slide 16 is placed in the first groove, a one-ounce weight, when fastened to the clip, will just overbalance the arm 12 around the fulcrum 14. When the clip is moved to the second groove 20, then a two-ounce weight will be required to overbalance the arm.

The important feature of this scale is that the pointed end of the beam 11 is provided with a raised portion 21 so that when the beam is overbalanced the slide 16 will not slip off the end of the beam. This prevents the members from becoming detached from each other.

A series of linear scale calibrations 22 are etched in the beam 10 so that the unit may be used as a measuring scale.

A further advantage of this construction is shown in Figure 4, from which it will be seen that sufficient spring is permitted between the fulcrum end of the arm 14 and the adjacent portion of the beam 10, that the clip 19 may be inserted between these two members and be resiliently secured in a fixed position therebetween. The clip in this position does not interfere with the use of the scale as a letter opener.

A further advantage of this construction over other scales known to the applicant is that a letter may be secured in the clip 19 and the slide 16 set at the one-ounce notch 20 and the unit then laid upon a table or the like. No reference need be made to the point at which fulcrum 14 is placed because if the slide is in this position and the beam does not overbalance, the operator may be assured that the letter will be carried for the regular three-cent rate. However, if the beam at this point overbalances, then the slide 16 is moved upwardly to the two-ounce groove and if at this point the beam does not overbalance, the double or six-cent rate is sufficient. Where a plurality of fulcrum points are provided, it is necessary that a flat table top be used and that extreme caution be taken to ascertain around which one of the several points the device is at the moment swinging.

Some changes may be made in the arrangement, construction and combination of the various parts of my improved scale without departing from the spirit of my invention and it is my intention to cover by my claims such changes as may be reasonably included within the scope thereof.

I claim as my invention:

1. A device of the character described comprising, a scale beam, one end of which is provided with a plurality of spaced graduations therealong, each of which comprises a pair of raised elements spaced along the beam to form a notch therebetween, a weighted arm secured to the other end of said beam, which arm extends back along the beam a portion of its length, the backward extending end of said arm being bent downwardly to form a fulcrum, a scale member slideably mounted upon the end of said beam opposite said weighted arm and adapted to be selectively received in said notches, a stop member extending laterally from the outer end of said graduated portion which limits the normal outward sliding movement of said scale member but over which said scale member may be forced without permanent distortion, and a clip secured to said scale member, for the purpose described.

2. A device of the character described comprising, a scale beam formed from a flat strip of relatively thin sheet metal, one end of which is provided with graduated notches therein, an arm formed of relatively heavy metal secured at one of its ends to the end of the beam opposite to that which is provided with the graduated notches, said arm extending back along the beam a portion of its length in close proximity thereto, the backwardly extending end of said arm having a fulcrum formed thereon, a scale member slidably mounted upon said beam over said notches, said scale member being adapted to selectively rest in any one of said notches, and a clip secured to said scale member, for the purpose described.

3. A device of the character described comprising, a scale beam formed from a flat strip of relatively thin sheet metal, one end of which is pointed and with the adjacent portion provided with notches spaced therealong, an arm formed of relatively heavy sheet metal secured to the other end of said beam, which arm extends back along said beam a portion of its length, the backwardly extending end of the arm being bent downwardly to form a fulcrum and said arm being secured to said beam only at its end opposite said fulcrum, a scale member slidably mounted upon said beam in position to coact with any one of said notches and a clip secured to said scale member, the resiliency of said beam permitting said clip to be inserted, when not in use, between the arm and said beam and to be frictionally retained therein.

4. A device of the character described comprising, a scale beam formed of a flat strip of relatively thin sheet metal, one end of which is provided with graduations thereon, an arm formed of relatively heavy sheet metal secured to the other end of said beam, which arm extends back along said beam a portion of its length, a fulcrum point extending downwardly from the backwardly extending portion of said arm, a scale member slidably mounted upon said beam over said graduations, and a clip secured to said scale member, the resiliency of said beam permitting said clip to be inserted when not in use between the arm and said beam and to be frictionally retained therein.

FRANK J. LINSLEY.